Sept. 17, 1929. A. F. MASURY 1,728,871
FLEXIBLE CONNECTION FOR MOTOR VEHICLE PANELS
Filed Sept. 1, 1928
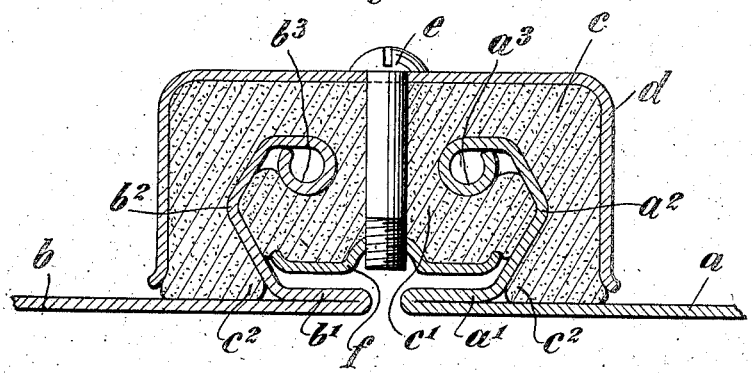
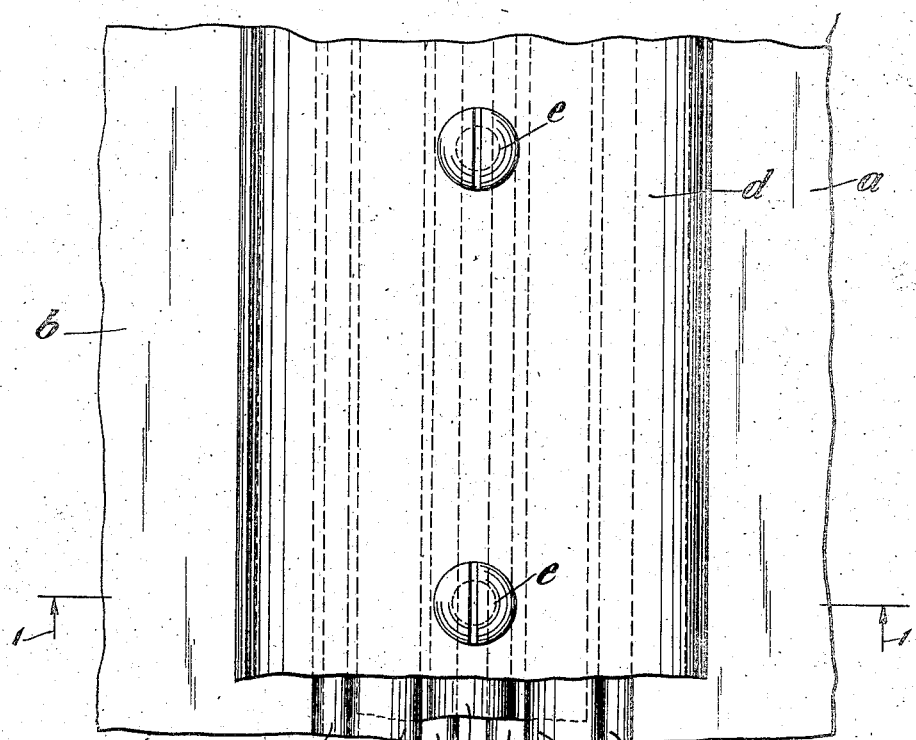
Inventor
Alfred F. Masury,
By his Attorneys
Redding, Greeley, O'Shea & Campbell Patented Sept. 17, 1929

1,728,871

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

FLEXIBLE CONNECTION FOR MOTOR-VEHICLE PANELS

Application filed September 1, 1928. Serial No. 303,462.

The present invention relates to an improved connection for securing adjacent panels of a vehicle body together yieldingly. In sectionalized bodies, wherein the latter are formed of a plurality of panels, it has been found that the securing of the panels to permit a degree of movement therebetween has necessitated an expensive operation since the connections have involved a considerable degree of hand fitting. It has been found highly desirable to connect the panels yieldingly through a non-metallic yielding material which prevents body squeaks and drumming while maintaining a sufficiently positive connection to secure the panels effectively, at the same time permitting a degree of movement therebetween.

An object of this invention is to provide a yielding connection between adjacent panels which is capable of permitting a desired degree of movement therebetween without impairing the strength of the connection, at the same time cushioning such movement and preventing a direct metal to metal contact between the adjacent panels. A further object resides in providing a connection which is easily constructed, preferably by simple stamping operations, to facilitate rapid production in large quantities.

More specifically, the present invention embodies adjacent panels which are formed with angular shaped extensions between, and around which a non-metallic yielding moulding is provided. A cover plate is mounted over the moulding and, by suitable bolts, cooperates with a strip between the extensions to secure the elements together and place the moulding under a predetermined degree of compression.

Further objects will appear as the invention is described in greater detail and reference will now be had to the accompanying drawings, wherein:

Figure 1 is a view in section taken on line 1—1 of Figure 2 and looking in the direction of the arrows, showing a form of connection in accordance with the present invention.

Figure 2 is a plan view of the connection shown in Figure 1.

Referring to the above drawings, $a$ designates a panel, the edge of which is turned back at $a'$ and formed with an angularly extending flange $a^2$, the extremity of which is turned back at $a^3$ to prevent cutting of the connecting element described hereinafter. The adjacent panel $b$ is similarly formed with a turned back portion $b'$ and an angularly extending flange $b^2$ with a turned back extension $b^3$.

Connecting the panels is a non-metallic yielding moulding $c$, preferably of rubber, the section of which resembles, generally, the letter M. The central portion of this moulding is provided with an inverted T-shaped portion $c'$ which spaces the angular portions $a^2$ and $b^2$ of the panels $a$ and $b$ apart, as clearly shown in Figure 1. The sides of the moulding are formed with inwardly extending toe portions $c^2$ which lie within the grooves formed by the re-entrant angles between the angular extensions $a^2$ and $b^2$ and the respective panels $a$ and $b$.

A U-shaped metallic plate $d$ confines the moulding in position and a bolt $e$ extends through the moulding to engage an inner metallic plate $f$ to compress the moulding to a desired degree. It will be seen that the degree of compression set up in the moulding may be varied by means of the bolt $e$ to afford a means for varying the rigidity of the connection. This construction prevents a direct metal to metal contact between adjacent panels and securely holds the latter together. The cooperating U-shaped plate and inner plate and angular extensions provide columns of rubber between the elements to resist, yieldingly, relative movement between the panels and all squeaks and drumming of the body are thereby eliminated. The connection is readily formed since simple stamping operations may be availed of to provide the members described above and the cost of manufacture is therefore quite low. Although the invention has been described in connection with the specific construction shown in the accompanying drawings, it is not to be limited, save as defined in the appended claims.

I claim as my invention:

1. A connection of the character described comprising a panel, an adjacent panel to be connected thereto, angular shaped extensions on adjacent ends of the panels, portions of the extensions lying substantially parallel to the panels, non-metallic yielding moulding between the extensions, a cover strip, a plate between the extensions parallel to the panels, and means to connect the plate and strip through the moulding to compress the latter in securing the panels thereby.

2. A connection of the character described comprising a panel, an adjacent panel to be connected thereto, angular shaped extensions on adjacent ends of the panels, portions of the extensions lying substantially parallel to the panels, non-metallic yielding moulding between the extensions, a U-shaped cover strip, a plate between the extensions parallel to the panels, and means to connect the plate and strip through the moulding to compress the latter in securing the panels thereby.

3. A connection of the character described comprising a panel, an adjacent panel to be connected thereto, angular shaped extensions on adjacent ends of the panels, portions of the extensions lying substantially parallel to the panels, non-metallic yielding moulding between the extensions, a U-shaped cover strip, a plate between the extensions, and a bolt passing through the moulding and lying between the extensions to connect the plate and strip to place the moulding under compression.

4. A connection of the character described comprising a panel, an adjacent panel to be connected thereto, angular shaped extensions on adjacent ends of the panels, portions of the extensions lying substantially parallel to the panels, a non-metallic yielding moulding M-shaped in cross section having an inverted T-shaped portion lying between the extensions, a U-shaped cover strip, a plate between the extensions and lying between the parallel portions of the extensions and the respective panels, and means to connect the plate and strip to place the moulding under compression.

5. A connection of the character described comprising a panel, an adjacent panel to be connected thereto, angular shaped extensions on adjacent ends of the panels, portions of the extensions lying substantially parallel to the panels, a non-metallic yielding moulding M-shaped in cross section having an inverted T-shaped portion lying between the extensions, a U-shaped cover strip, portions of moulding lying between the sides of the U-shaped cover strip and the extensions, a plate between the extensions and lying between the parallel portions of the extensions and the respective panels, and means to connect the plate and strip to place the moulding under compression.

This specification signed this 27 day of August, A. D. 1928.

ALFRED F. MASURY.